(12) United States Patent
Siegwart

(10) Patent No.: US 6,901,831 B2
(45) Date of Patent: Jun. 7, 2005

(54) SUPPORT FIXTURE

(75) Inventor: Rudolf Siegwart, Ottensheim (AT)

(73) Assignee: WFL Millturn Technologies GmbH & GmbH & Co. KG, Linz (AT)

( * ) Notice: Subject to any disclaimer, the term of this patent is extended or adjusted under 35 U.S.C. 154(b) by 0 days.

(21) Appl. No.: 10/816,039

(22) Filed: Apr. 1, 2004

(65) Prior Publication Data
US 2004/0194593 A1 Oct. 7, 2004

(30) Foreign Application Priority Data
Apr. 2, 2003 (DE) .......................................... 103 15 006

(51) Int. Cl.[7] .............................................. B23B 13/12
(52) U.S. Cl. ............................. 82/162; 82/164; 82/127
(58) Field of Search ........................ 82/162, 164, 127, 82/170, 903; 279/133; 414/22.61

(56) References Cited

U.S. PATENT DOCUMENTS

| 4,517,866 | A | * | 5/1985 | Bazuin | .......................... | 82/164 |
| 4,546,681 | A | * | 10/1985 | Owsen | .......................... | 82/162 |
| 5,347,897 | A | * | 9/1994 | Rouleau | ........................ | 82/164 |
| 5,525,017 | A | * | 6/1996 | Asada | .......................... | 409/197 |
| 5,960,689 | A | * | 10/1999 | Warren | .......................... | 82/127 |

FOREIGN PATENT DOCUMENTS

EP        0988923 A1        3/2000

* cited by examiner

Primary Examiner—Willmon Fridie, Jr.
(74) Attorney, Agent, or Firm—Pandiscio & Pandiscio

(57) ABSTRACT

In a fixture for supporting a workpiece in a machine tool by means of two support elements held in a housing with the workpiece lying on them, the support elements are configured as levers held in a rotating mounting in the housing, the levers being driveably connected together by means of a threaded spindle. The threaded spindle has counter-rotating thread sections in areas corresponding to the support elements, and each of the counter-rotating thread sections of the spindle engage in a sliding block, the sliding blocks being rotatably mounted in holes in the support elements. The threaded spindle is provided with a device for locking the support elements in a set operating position. The two support elements are jointly adjustable and lockable, so that they can be set and readjusted within a short time and in a manner so that production inaccuracies are precluded.

12 Claims, 5 Drawing Sheets

SUPPORT FIXTURE

BACKGROUND OF THE INVENTION

1. Field of the Invention

The present invention concerns a fixture for supporting a workpiece in a machine tool, in particular a crankshaft in an inclined-bed turning and milling machine, by means of two support elements arranged at a lateral distance from one another and radially moveable in relation to the workpiece, the support elements being held in a housing, having the workpiece lying on them and with their ends facing away from the workpiece being formed as two levers in a swiveling mounting in the housing, in which case the levers are driveably connected to one another by a threaded spindle, with the threaded spindle displaying counter-rotating thread sections in its areas corresponding to the two support elements, with each of the threaded sections engaging in a sliding block and held in a rotating mounting in the holes worked into the support elements at an angle perpendicular to the threaded spindle.

2. Description of the Prior Art

A support fixture of this type, also referred to as a steady rest, is familiar from EP 0 988 923 A1. Although the support elements are adjusted jointly by the threaded spindle, it is not possible to provide satisfactory support for a workpiece while it is being machined. This is because the forces arising are very considerable, in particular during roughing-down work, with the result that the support elements, which are only mutually supported by the threaded spindle, are deflected so that it is frequently necessary to accept production tolerances, particularly since the threaded sections which engage in one another have to allow for play. Consequently, the application range for this support fixture of prior art is limited.

SUMMARY OF THE INVENTION

The task of the present invention is therefore to configure a support fixture of the aforementioned type in such a way that no deflection of the support elements occurs even when they are subjected to considerable loads and therefore to eliminate production inaccuracies. Indeed, it should be easily possible to block the adjustable components of the support fixture and thereby prevent unwanted adjustment movements. Furthermore, it is an intention of the present invention to make the support fixture small, to provide it with a wide adjustment range and to allow it to be operated outside the machine tool so that adjustments can be performed without difficulty and in a short period of time. The design by means of which this is to be achieved should be a straightforward one, although nevertheless permitting workpieces to be supported in a manner which permits safe and secure operation. Despite the ease of handling, therefore, a wide degree of flexibility should be assured.

In accordance with the present invention, this is achieved in a support fixture of the aforementioned type in that the threaded spindle is provided with a device for locking it in the operating position to which it is set.

In a straightforward embodiment, the locking device for the threaded spindle can consist of an adjusting element connected to the housing of the fixture, through which the threaded spindle is passed, and one or two expanding wedges which interact with the threaded spindle and the adjusting element, in which case the threaded spindle should be provided with an abutting piece arranged inside the adjusting element and on the threaded spindle, for example in the form of a screwed-on ring, between which ring and the adjusting element it is possible to clamp the expanding wedges, in a preferred embodiment with the help of servo devices.

To provide for automatic adjustment for any misalignment between the support elements, the adjusting element should be able to swivel and be adjustable in height in relation to the threaded spindle, meaning that it needs to be able to move in the housing in a cardan-like mounting. This can be achieved by forming a spigot directly onto the housing or spigots onto each of the sliding blocks inserted into the housing which engage in the holes worked into the adjusting element, while in order to allow the height of the adjusting element to be adjusted there should be a sliding block inserted into each of the grooves worked into the housing and connected to the adjusting element.

In accordance with an extremely advantageous embodiment, provision is made for moving the centering point of the workpiece in the axial direction of the threaded spindle so that it can be adjusted when the locking device is blocked.

This can be achieved in a straightforward manner by mounting the locking device in a slide using a cardan-type arrangement with the sliding blocks, with the slide being adjustable in the grooves worked into the plates of the housing of the fixture by means of a tension element which, in a preferred embodiment, is configured as a rotating spindle.

Furthermore, it is advantageous for the threaded spindle to be located approximately in the center between the bearing pins of the support elements which form articulation points, to provide contact rollers for the workpiece on the support elements and to manufacture the housing using two plates kept at a distance from one another, with the support elements and their bearing pins inserted in between the plates. Furthermore, there should be a space provided in each of the support elements on both sides of the sliding blocks for accommodating the threaded spindle in the event of any misalignments.

Additionally, it is advantageous to provide the fixture with a support lever in a pivoting bearing in the housing and preferably actuated using a servo device, with the support lever acting on the side of the workpiece facing away from the support elements, and to equip the support elements with exchangeable adapters mounted on them.

If a support fixture is embodied in accordance with the present invention, then it is possible without any difficulty to adjust the two support elements by means of the threaded spindles connected to them by counter-rotating thread sections, with the threaded spindles at the side adjacent to the workpiece being actuated manually or by a machine and to block them once they have reached their operating position with the effect that the support elements are fixed in place and cannot be jolted out of position. In this case, the support elements are jointly moved towards or away from the center point of the workpiece which they are to support depending on the direction of rotation of the threaded spindles, with the result that an adjustment or readjustment can quickly and easily be performed after a workpiece has been inserted. Also, once the workpiece to be machined is lying on the support elements, the threaded spindles and the support elements connected to them are clamped against the housing in this operating position with the help of the locking device, meaning that any positional change of the workpiece and consequential production inaccuracies during its machining are practically excluded.

The construction complexity required to manufacture the support fixture is small, which means that it can be manufactured inexpensively. Also, because it is possible to select a large adjustment range for the swiveling support elements or due to the fact that they are equipped with an adapter and the proposed support fixture is small in size, the fixture can easily be used in a range of applications, in particular also on inclined bed machine tools.

BRIEF DESCRIPTION OF THE DRAWINGS

The drawing shows a sample embodiment of the support fixture configured in accordance with the present invention, the details of which are explained below. In the drawing.

DESCRIPTION OF THE PREFERRED EMBODIMENTS

Figure 1:
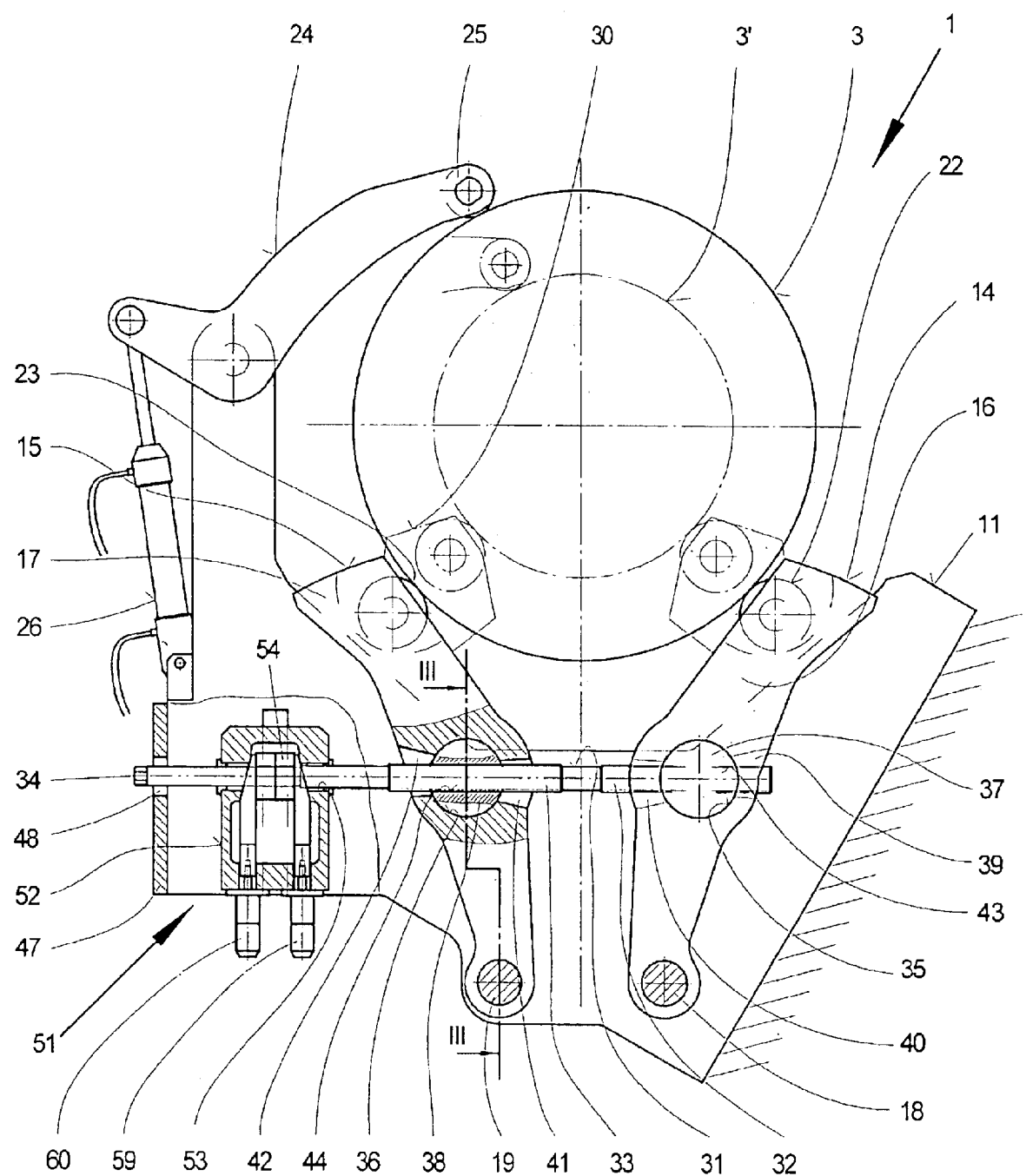
FIG. 1 shows the support fixture installed in a machine tool, as a front elevation and partial section, as well as in magnified views.
Figure 2:
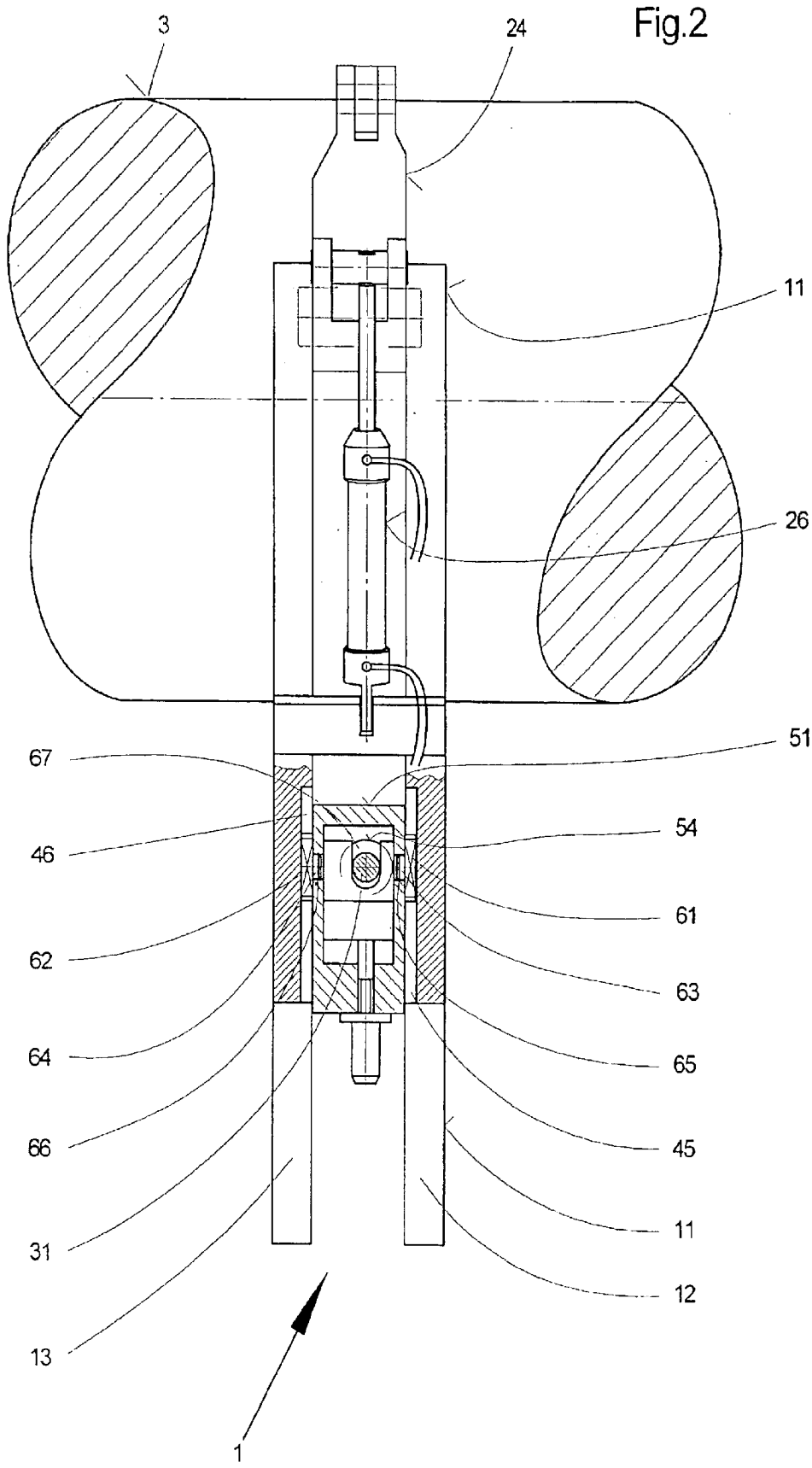
FIG. 2 shows the support fixture in accordance with FIG. 1 in a side view, also as a partial section.

The fixture shown in FIGS. 1 and 2 and identified with 1 is used for supporting in particular large and heavy workpieces 3 in a machine tool 2, e.g. in an inclined bed turning and milling machine, and chiefly comprises two support elements 14 and 15 in a swiveling mounting in a housing 11, the support elements 14 and 15 being in a driven connection with one another for the purpose of joint adjustment by means of a threaded spindle 31. The threaded spindle 31 is provided with two counter-rotating thread sections 32 and 33 which engage in sliding blocks 37 and 38 held in the support elements 14 and 15, the sliding blocks 37 and 38 being provided with corresponding threaded holes 43 and 44.

Figure 3:
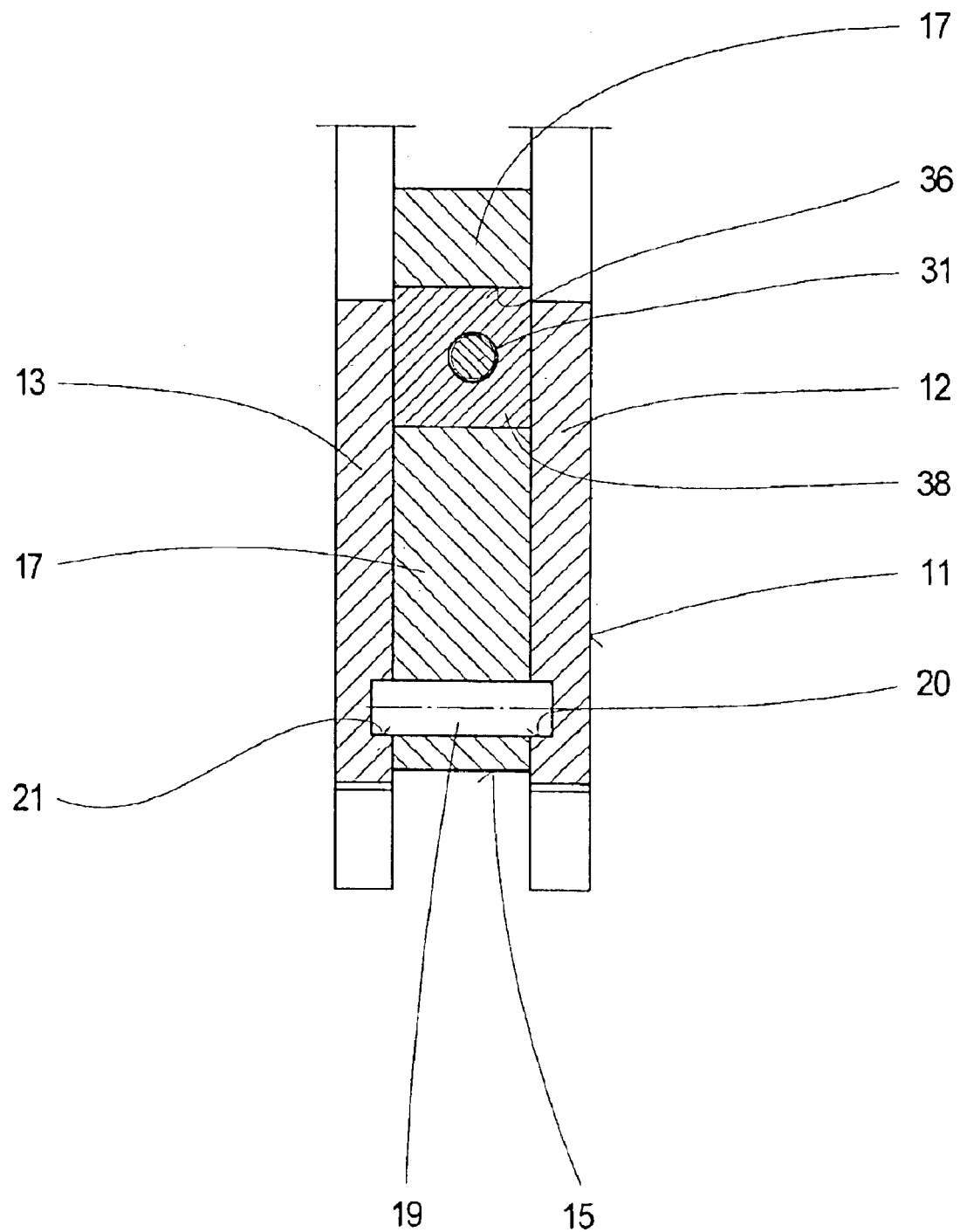
FIG. 3 shows a section through line III—III of FIG. 1.

In the sample embodiment illustrated, the housing 11 comprises two plates 12 and 13 arranged with a gap in between one another, in which, as shown in particular in FIG. 3, the ends of the support elements 14 and 15 formed as levers 16 and 17 facing away from the workpiece 3 are held in a swiveling mounting in holes 20 and 21 worked into the plates 12 and 13 by means of pins 18 and 19. Two rollers 22 and 23 are attached to the ends of the support elements 14 and 15 opposite the pins 18 and 19 and the workpiece 3 is in contact with the rollers 22 and 23.

The sliding blocks 37 and 38 screwed onto the threaded spindle 31 are configured as cylindrical rollers and inserted in holes 35 or 36 which are worked into the levers 16 and 17 of the support elements 14 and 15 perpendicular to the threaded spindle 31. In addition, openings 39 and 40 or 41 and 42 are worked into the levers 16 and 17 on both sides of the sliding blocks 37 and 38, and the spindle 31 can engage in the openings 39 and 40 or 41 and 42 during swiveling movements of the levers 16 and 17.

If the threaded spindle 31 is turned by means of a tool which can be placed onto the end piece 34 of the threaded spindle 31 projecting from the housing 11 (the end piece 34 passes through a support plate 47 screwed onto the plates 12 and 13 of the housing which is provided with a hole 48), then the two support elements 14 and 15 are swiveled about the pin 18 and 19 towards or away from one another depending on the direction of rotation. The sliding blocks 37 and 38 rotate in the holes 35 and 36 in this process in order to compensate for the swiveling movements of the support elements 14 and 15, so that the threaded spindle 31 is displaced in parallel upwards or downwards. The rollers 22 and 23 of the support elements 14 and 15 are therefore jointly and evenly moved on the workpiece 3 towards or away from the workpiece 3.

Figure 4:
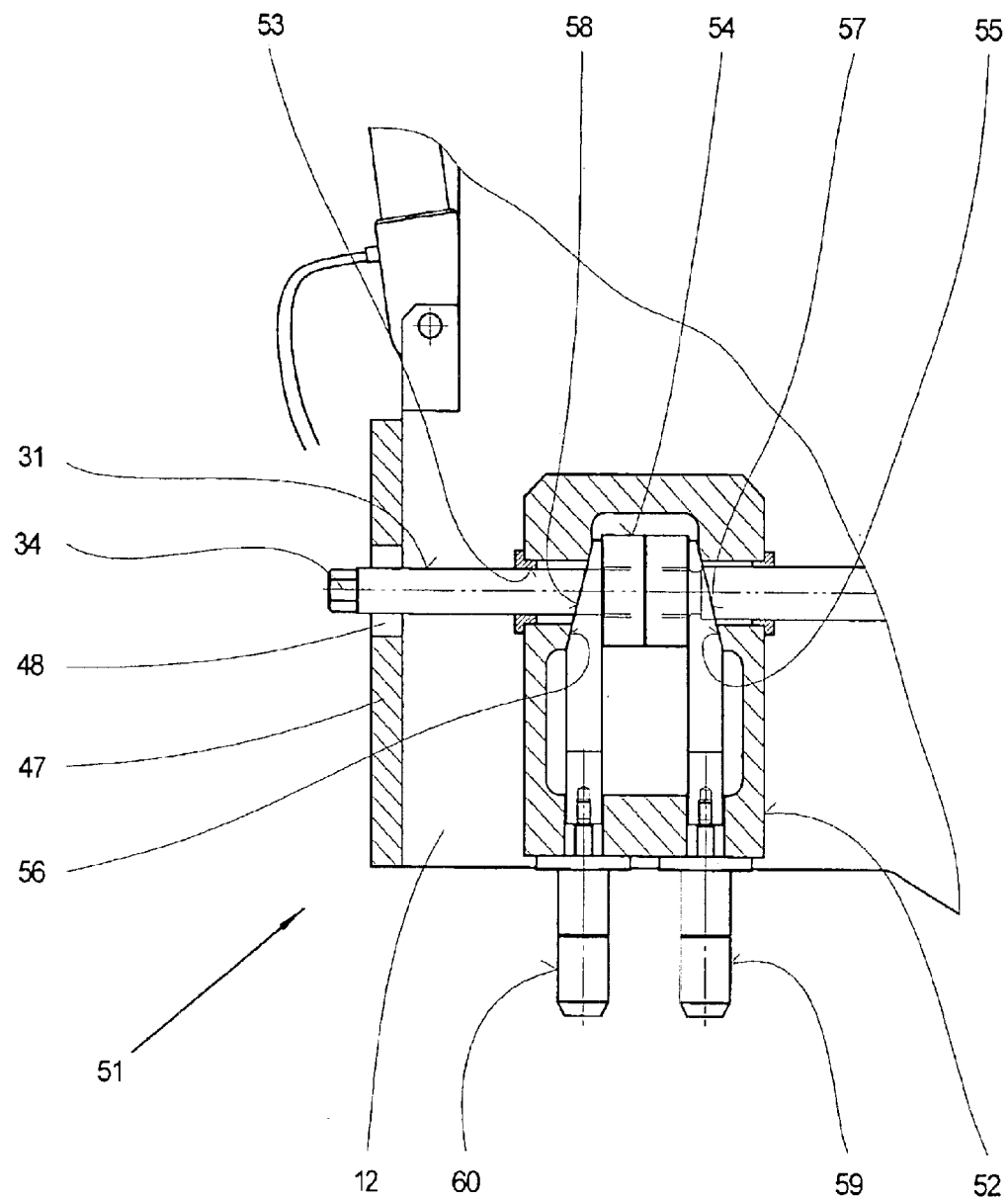
FIG. 4 shows the locking device in the support fixture in accordance with FIG. 1 in a magnified view and in an axial section and FIG. 5 shows the arrangement of the locking device in an adjustable slide.

If a workpiece 3 is supported in the fixture 1 as shown in FIG. 1, and if the workpiece 3 should be machined, the support levers 14 and 15 are locked in this operating position. A locking device 51 is provided for this purpose, as shown as a section in FIG. 4.

In an adjusting element 52 configured like a housing with holes 53 through which the threaded spindle 31 passes, wedge surfaces 55 and 56 are worked onto two mutually opposite internal sides while an abutting piece configured as a ring 54 is fitted onto the threaded spindle 31, between which wedge pieces 57 and 58 movable by servo devices 59 and 60 engage. When the servo devices 59 and 60 are actuated, the wedge pieces 57 and 58 are pushed in the direction of the threaded spindle 31 so that the adjusting element 52 is firmly clamped against the threaded spindle 31 by means of the ring 54 with the effect that the support levers 14 and 15 are blocked.

The locking device 51 is supported in the housing 11 in such a way as to allow for its height to be adjusted and for it to be swiveled in order to permit compensation for any misalignment resulting during the clamping of the workpiece 3 and/or its machining. As shown in FIG. 2, this compensating adjustment is facilitated by sliding blocks 61 and 62 inserted in grooves 45 and 46 worked into the plates 12 and 13, the sliding blocks 61 and 62 being provided with spigots 63 and 64 projecting in the direction of the adjusting element 52. Furthermore, the adjusting element 52 can be slightly rotated about the axis of the spigots 63 and 64 when the support elements 14 and 15 are displaced due to the workpiece 3, while the height of the adjusting element 52 can be adjusted by the movement of the sliding blocks 61 and 62 in the grooves 45 and 46.

In order to allow the wedge pieces 57 and 58 to be inserted into the adjusting element 52 at the height of the threaded spindle 31, they have slot-type openings 67 worked into them, with the openings 67 accommodating the threaded spindle 31. In addition, the side of the support fixture 1 facing away from the support elements 14 and 15 is equipped with a swiveling support lever 24 which acts on the workpiece 3 by means of a roller 25 and can be actuated with the help of a servo device 26. In addition, as indicated by a dashed/dotted line in FIG. 1, the support elements 14 and 15 can be equipped with adapters 30 so that even workpieces 3' with a smaller diameter can be safely and securely supported in the fixture 1.

Figure 5:
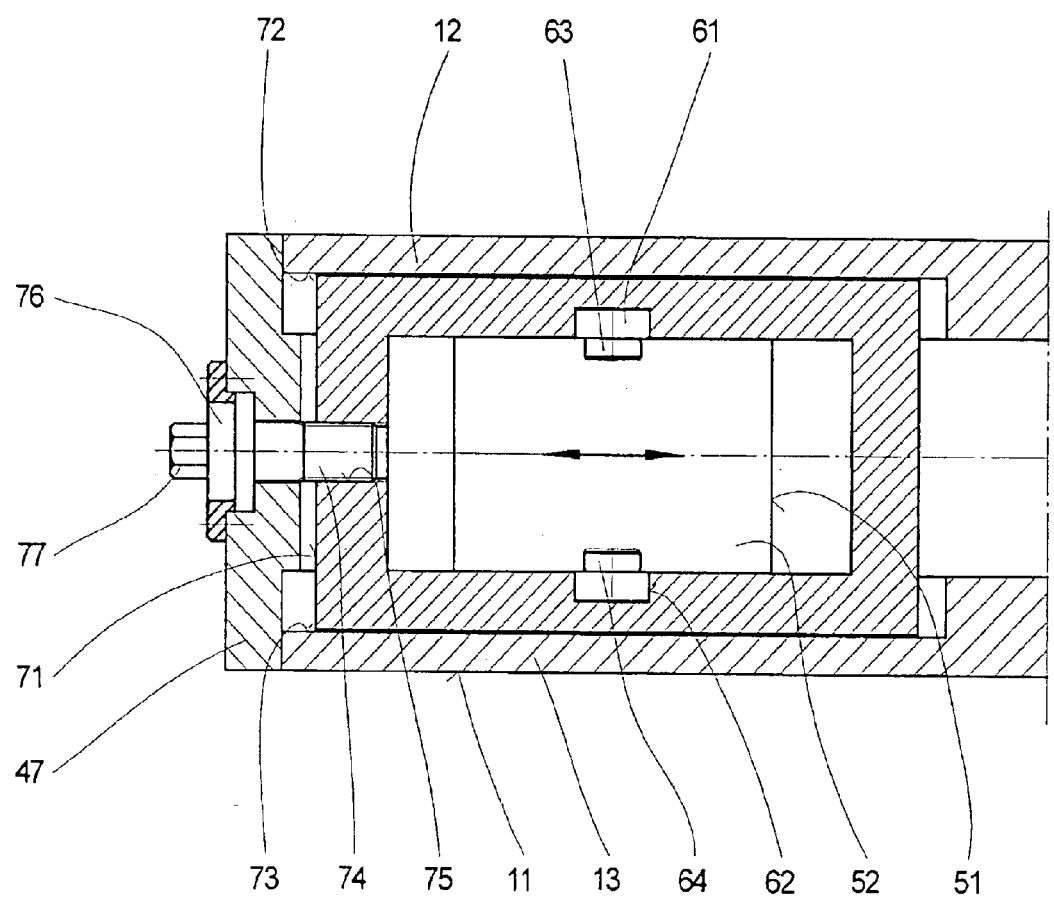

FIG. 5 shows a schematic view of how the blocked locking device 51 can be subsequently moved towards the threaded spindle 31 in order to undertake any necessary adjustment of the center point of the clamped workpiece 3.

The adjusting element 52 of the locking device 51 is held in a cardan-type mounting in a slide 71 by means of the sliding blocks 61 and 62 and the spigots 63 and 64 which project from the sliding blocks 61 and 62 and engage in the adjusting element 52, with the slide 71 being adjustably guided in grooves 72 and 73 worked into the plates 12 and 13 of the housing 11. In addition, a rotating spindle 74 engages in a threaded hole 75 provided in the slide 71, the rotating spindle 74 being held in a rotating mounting in a collar 76 held in the support plate 47.

If a workpiece is positioned using the key surface 77 worked onto the end of the rotating spindle 74 projecting from the housing 11, thereby involving the rotation of the rotating spindle 74, then the spindle screws itself into or out of the threaded hole 75—depending on the direction of rotation—with the effect that the slide 71 and, with it, the locking device 51, are adjusted horizontally. Also, because the locking device 51 is firmly connected to the threaded spindle 31, the threaded spindle 31 is moved as well and, as a result, the support elements 14 and 15 of the fixture 1 are swiveled. In this way, subsequent adjustment of the center point of the clamped workpiece 3 is easily possible. Any resulting height misalignment is compensated for by the cardan-type mounting of the adjusting element 52 of the locking device 51.

What is claimed is:

1. A fixture (1) for supporting a workpiece in a machine tool (2), in particular a crankshaft in an inclined-bed turning and milling machine, by means of two support elements (14, 15) arranged at a lateral distance from one another and radially moveable in relation to a workpiece (3), the support elements (14, 15) being held in a housing (11), having the workpiece (3) lying on them and with their ends facing away from the workpiece (3) being formed as two levers (16, 17) in a swiveling mounting in the housing (11), in which case the levers (16, 17) are driveably connected to one another by a threaded spindle (31), with the threaded spindle (31) displaying counter-rotating thread sections (32, 33) in its areas corresponding to the two support elements (14, 15), with each of the threaded sections (32, 33) engaging in a sliding block (37 or 38) and held in a rotating mounting in holes (35, 36) worked into the support elements (14, 15) at an angle perpendicular to the threaded spindle (31): characterized in that, the threaded spindle (31) is provided with a locking device (51) for locking it in the operating position to which it is set, the locking device (51) for the threaded spindle (31) comprising an adjusting element (52) connected to the housing (11) of the fixture (1), through which the threaded spindle (31) is passed, and two expanding wedges (57, 58) which interact with the threaded spindle (31) and the adjusting element (52).

2. The fixture in accordance with claim 1, characterized in that, the threaded spindle (31) is provided with an abutting piece (54) arranged inside the adjusting element (52) and on the threaded spindle (31), in the form of a ring, between which ring and the adjusting element (52) the expanding wedges (57, 58) are clamped, with the help of servo devices (59, 60).

3. The fixture in accordance with claim 1, characterized in that, to provide for automatic adjustment for any misalignment, the adjusting element (52) of the locking device (51) is able to swivel and is adjustable in height in relation to the threaded spindle (31) in the housing (11) of the fixture (1).

4. The fixture in accordance with claim 3, characterized in that, a spigot (63, 64) is mounted directly onto the housing (11) or onto each of sliding blocks (61, 62) inserted into the housing (11), each of which engage in holes (65, 66) worked into the adjusting element (52).

5. The fixture in accordance with claim 3, characterized in that in order to allow the height of the adjusting element (52) to be adjusted there is provided a sliding block (61, 62) inserted into each of grooves (43, 44) worked into the housing (11) and connected to the adjusting element (52).

6. The fixture in accordance with claim 1, characterized in that, the locking device (51) is adjustable in the axial direction of the threaded spindle (31) so that a centering point of the workpiece (3) can be adjusted in the axial direction of the threaded spindle (31).

7. The fixture in accordance with claim 6, characterized in that, the locking device (51) is mounted in a slide (71) using a cardan-type arrangement with sliding blocks (61, 62), with the slide (71) being adjustable in grooves (72, 73) worked into plates (12, 13) of the housing (11) of the fixture (1) by means of a tension element which is configured as a rotating spindle (74).

8. The fixture in accordance with claim 1, characterized in that, the threaded spindle (31) is located approximately in the center between bearing pins (18, 19) of the support elements (14, 15) and contact rollers (22, 23) for the workpiece (3) provided on the support elements (14, 15).

9. The fixture in accordance with claim 7, characterized in that, the housing (11) comprises the two plates (12, 13) kept at a distance from one another, between which the support elements (14, 15) and their bearing pins (18, 19) are arranged.

10. The fixture in accordance with claim 1, characterized in that, a space (39, 40 or 41, 42) is provided in the support elements (14, 15) on both sides of the sliding blocks (37, 38) for accommodating the threaded spindle (31).

11. The fixture in accordance with claims 1, characterized in that, the fixture (1) is provided with a support lever (24) in a pivoting bearing in the 25 housing (11) and actuated using a servo device (26), with the support lever (24) acting on a side of the workpiece (3) facing away from the support elements (14, 15).

12. The fixture in accordance with claim 1, characterized in that, the support elements (14, 15) are provided with exchangeable adapters (30) mounted on them.

* * * * *

UNITED STATES PATENT AND TRADEMARK OFFICE
CERTIFICATE OF CORRECTION

PATENT NO. : 6,901,831 B2
DATED : June 7, 2005
INVENTOR(S) : Rudolf Siegwart

It is certified that error appears in the above-identified patent and that said Letters Patent is hereby corrected as shown below:

Title page,
Item [73], Assignee, change "WFL Millturn Technologies GmbH & GmbH & Co. KG" to -- WFL Millturn Technologies GmbH & Co. KG --.

Column 6,
Line 44, delete "25" before "housing".

Signed and Sealed this

Twenty-ninth Day of November, 2005

JON W. DUDAS
*Director of the United States Patent and Trademark Office*